:::
United States Patent [19]
Göransson

[11] 3,993,330
[45] Nov. 23, 1976

[54] CONDUITS FOR ELECTRICAL CONDUCTORS

[76] Inventor: Bengt Sigvard Göransson, 6 Ridvagen, 73600 Kungsor, Sweden

[22] Filed: Feb. 10, 1976

[21] Appl. No.: 656,985

Related U.S. Application Data

[63] Continuation-in-part of Ser. No. 537,775, Dec. 31, 1974, abandoned.

[52] U.S. Cl. .............................. 285/14; 174/65 R; 174/83; 285/55; 285/93; 285/158; 285/243; 285/322; 285/DIG.4
[51] Int. Cl.$^2$ ..................................... F16L 33/18
[58] Field of Search ............ 285/242, 331, DIG. 4, 285/161, 162, 14, 55, 404, 256, 55, 14, 259, 158, 322, 243; 174/83, 65 R

[56] References Cited
UNITED STATES PATENTS

| | | | |
|---|---|---|---|
| 2,947,800 | 8/1960 | Badeau et al. | 174/83 |
| 3,222,091 | 12/1965 | Marshall | 285/259 X |
| 3,251,612 | 5/1966 | Webbe | 285/55 X |
| 3,454,291 | 7/1969 | Goldsobel et al. | 285/161 X |
| 3,698,745 | 10/1972 | Mundt | 285/256 |

FOREIGN PATENTS OR APPLICATIONS

| | | | |
|---|---|---|---|
| 817,969 | 8/1959 | United Kingdom | 285/404 |

Primary Examiner—Thomas F. Callaghan

[57] ABSTRACT

A liquid tight coupling means between a flexible cable conduit and a bulkhead, the coupling means having a tubular sleeve therein of plastics material which defines with the body of the coupling means an annular recess into which the end of the conduit can be fitted. The arrangement is characterized in that the conduit is formed, in a known manner, as a spirally wound tube having a lining of plastics material applied thereto, in that the tubular sleeve defines a passageway through which electrical conductors can be passed without possibility of contact between conductors and conduit end, in that the tubular sleeve has a part projecting beyond the bulkhead engaging end of the body of the coupling means so that conductors can emerge from that end without possibility of contact between said conductors and that end and so that an end face sealing means for the coupling means is provided, in that the sleeve has a conicity so that when the conduit end is inserted into said annular recess the lining of the conduit is caused to grip the sleeve tightly, and in that the sleeve has a spiral of sealing material sealing between the sleeve and the conduit lining.

2 Claims, 2 Drawing Figures

CONDUITS FOR ELECTRICAL CONDUCTORS

BACKGROUND OF THE DISCLOSURE

This invention relates to conduits for electrical conductors and is a continuation-in-part of my U.S. application Ser. No. 537,775 filed Dec. 31, 1974 and now abandoned.

The present invention is concerned with providing an improved coupling between a flexible conduit end and a bulkhead so that conductors inside the conduit can pass through the bulkhead with minimum risk of water, and other contamination such as dust, on the outside of the coupling entering the coupling and thereby finding its way through the bulkhead or to conductors inside the conduit.

The invention finds application with conduits formed as a spirally wound profiled tube having a lining of plastics material applied thereto. The invention also finds application with conduit couplings of the kind having a sleeve which fits into a conduit end such as disclosed for example in U.S. Pat. No. 3,454,291.

SUMMARY OF THE INVENTION

The features of the present invention are seen in a liquid tight coupling means for a cable conduit comprising a drainable connector body with means for clamping the body to the conduit, the body having a through bore and providing a bulkhead engaging end with an open bore and a conduit clamping end with a open bore and a tubular sleeve, coaxial within the body, to define with the body an annular recess into which the end of a conduit, formed as a spirally wound tube having a lining of plastics material applied thereto, is inserted to embrace the sleeve, the tubular sleeve also having these characteristics:

a. it defines a passageway through which electrical conductors can be passed without possibility of contact between conductors and conduit end, b. it has a part projecting beyond the bulkhead engaging end of the connector body so that conductors can emerge from said end without possibility of contact between said conductors and the end and so that an end face seal for the connector body to a bulkhead is provided, c. it has a conicity so that when the conduit end is inserted to embrace the sleeve the lining of the conduit is caused to grip the sleeve tightly, and d. it has a spiral of sealing material sealing between the sleeve and the conduit lining.

The means for clamping the body to the conduit may comprise, in a manner already known, a tongue which is a part of the connector body, which can be deflected by a screw to engage the conduit over at least two convolutions of the helix of the conduit. In an improvement to this known clamping means, the connector body has at least two tongues and the screw for deflecting a selected one of the tongues is mounted on a sleeve which can be rotated about the body to bring the screw into engagement with the selected tongue. In this way the body of the coupling means can be clamped to a conduit with improved accessibility and hence one avoids the possibility of poor clamping and hence poor sealing if the screw has to be tightened in an inaccessible position.

DESCRIPTION OF PREFERRED EMBODIMENTS

The invention will now be described further, by way of example only, with reference to the drawing illustrating one embodiment thereof and in which.

Figure 1:
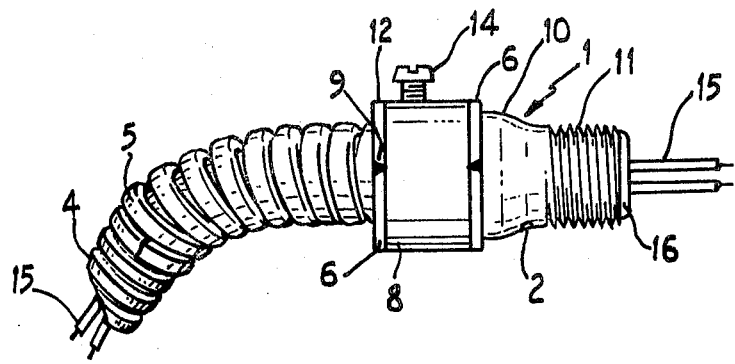
FIG. 1 is a perspective view of the embodiment.
Figure 2:
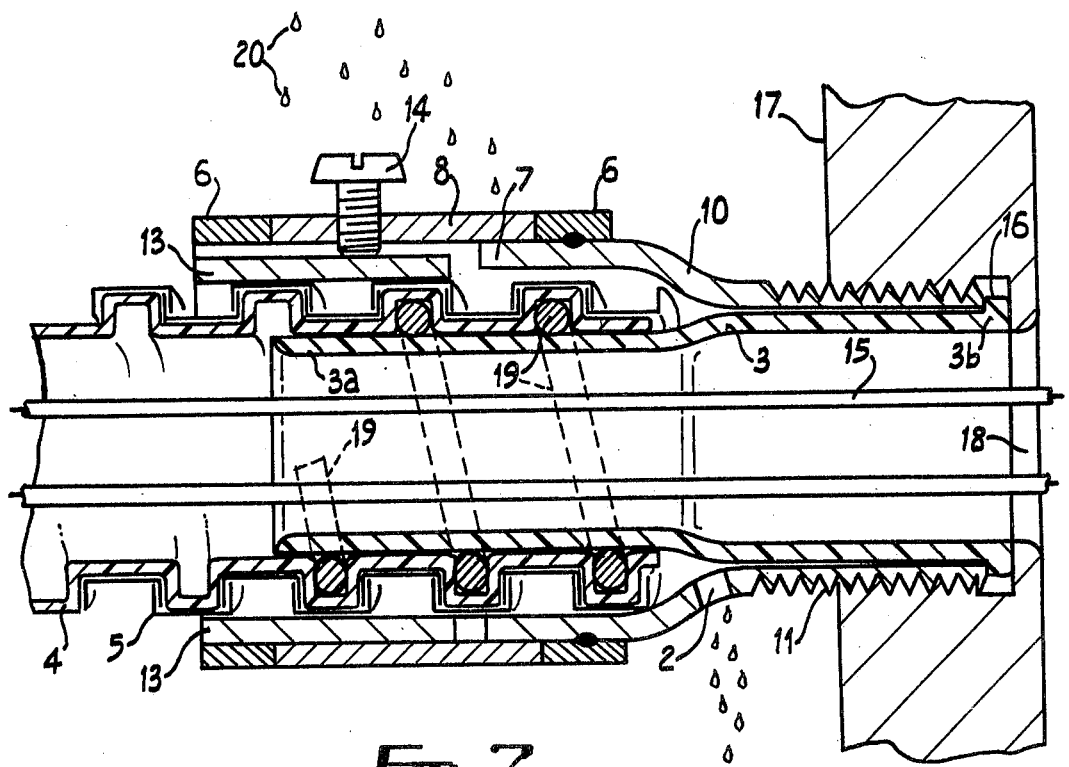
FIG. 2 is a longitudinal section, drawn to a larger scale of the embodiment shown in FIG. 1.

Referring now to the drawing, a conduit is formed as a spirally-wound, profiled metal tube 5 having a lining 4 of plastics material. The conduit is terminated by a coupling means 1 having a drainable connector body 10 with a threaded bulkhead engaging end 11 and a clamping end 12. The body 10 has at its end 12, a tube part 7 which is slit to define two tongues 13. A sleeve 8 surrounds and is rotatable on the end 12 and is held at the end 12 by rings 6 welded to the body 10. The sleeve 8 has a clamping screw 14 which can be screwed onto either of the tongues 13 according to the rotary position of the sleeve 8, to press the selected tongue into contact with tube 5 and thereby clamp the coupling means 1 to the conduit. The rings 6 have marks 9 to aid correct positioning of sleeve 6.

The coupling means 1 has an internal sleeve 3 of rigid plastics material which, at end 3a, seals against the lining 4 and at the other end 3b seals against the end 11 at a flange 16 when that end 11 is screwed into a bulkhead 17 thus providing an end seal for the connector body 10. The body 10 also as a drainage hole 2 for liquid which may collect between the sleeve 3 and the body 10. The sleeve 3 has a slight conicity (between 1° to 5° and not apparent in the drawing) so that when the conduit end is fitted in the coupling means 1 the sleeve 3 and lining 4 grip tightly.

Electrical conductors 15 are shown passing along the conduit 5 and through the coupling means 1 to enter through an opening 18 in the bulkhead 17. The sleeve 3 ensures that conductors 15 cannot contact the rough end of conduit 5. At the same time the flange 16 of sleeve 3, which flange projects beyond the bulkhead engaging end 11, ensures that conductors 15 cannot contact that end. Whilst serving this protective function, the sleeve 3 also serves an end face sealing function. The flange 16 prevents ingress of water and other contamination at end 11 and end 3a seals with lining 4 when aided by a spiral 19 of sealing material between sleeve and lining. Thus the coupling shown in the drawing is suitable for use in wet atmosphere such as in a location subject to spray or rain and in contaminated atmospheres. A spray is shown by droplets 20 incident upon the coupling. These droplets tend to drain along the outside of the conduit tube 5 and some will inevitably enter the body 10. The moisture in body 10 cannot however find entry into the sleeve 3 or reach the conductors 15. Any water collecting inside the body 10 can drain through the drainage hole 2. A number of drainage holes 2 could be provided at different angular positions about the coupling means so that drainage might readily take place whatever the orientation of the coupling means 1.

I claim:

1. The combination of a spirally wound, profiled, metal tube conduit having a lining of plastics material and a coupling means for terminating said conduit at a bulkhead in which said coupling means comprises; a drainable connector body with means for clamping the body to the conduit, the body having a through bore and providing a bulkhead engaging end with an open bore a conduit clamping end with an open bore; and a tubular sleeve, coaxial within the body, to define with the body an annular recess; into which the end of the conduit fits to embrace the sleeve, the tubular sleeve having these features;
- a. it defines a passageway through electrical conductors can be passed without possibility of contact between conductors and conduit end,
- b. it has a part projecting beyond the bulkhead engaging end of the connector body so that conductors can emerge from said end without possibility of contact between said conductors and the end and so that an end face seal for the connector body to a bulkhead is provided,
- c. it has a conicity so that when the conduit end is inserted to embrace the sleeve the lining of the conduit is caused to grip the sleeve tightly, and
- d. it has a spiral of sealing material sealing between the sleeve and the conduit lining.

2. The combination as claimed in claim 1 in which the means for clamping the connector body to the conduit comprises a sleeve rotatable to take up selected positions around the connector body, said sleeve having a screw which can press on the connector body to deflect a part thereof into contact with the conduit.

* * * * *